Dec. 15, 1936.    T. W. PICKARD    2,064,178
SPRAYER
Filed Dec. 17, 1935    2 Sheets-Sheet 1

INVENTOR.
Thomas W. Pickard.
BY Corbett + Mahoney
ATTORNEYS.

Dec. 15, 1936.   T. W. PICKARD   2,064,178
SPRAYER
Filed Dec. 17, 1935   2 Sheets-Sheet 2

INVENTOR.
Thomas W. Pickard.
BY
ATTORNEYS.

Patented Dec. 15, 1936

2,064,178

UNITED STATES PATENT OFFICE 2,064,178

SPRAYER

Thomas W. Pickard, Columbus, Ohio

Application December 17, 1935, Serial No. 54,863

2 Claims. (Cl. 299—83)

My invention relates to a sprayer. It has to do, more particularly, with a device for spraying a solution of an insecticide, fertilizer or other substance upon plants or other objects. However, it is not necessarily limited thereto.

A number of spraying devices of the general type indicated have been devised in the past. However, most of such prior art spraying devices are possessed of certain undesirable features. In most cases they are of a complicated structure, and, consequently, expensive to manufacture. Furthermore, most of these prior art devices are not provided with means for insuring that as the water passes through the device it will become sufficiently impregnated with the insecticide or other substance. Also, means is not provided in these prior art devices for insuring that the concentration of the solution sprayed from the device will be substantially uniform at all times. These prior art devices have been possessed of other undesirable features.

One of the objects of my invention is to provide a spraying device of the general type indicated which is of a very simple structure and, therefore, inexpensive to make and which will work very efficiently.

Another object of my invention is to provide a spraying device of the type indicated which is provided with a cartridge of an insecticide substance or other substance with which the water will contact as it flows through the sprayer and which is provided with means for causing the water to contact with the cartridge in such a manner that the cartridge will be readily dissolved and the solution produced will have the desired strength.

Another object of my invention is to provide a spraying device of the type indicated which is of such a nature that the solution sprayed from the device will always have substantially the same concentration even after the cartridge has been dissolved away to a considerable extent.

In its preferred form, my invention contemplates the provision of a spraying device which may be easily connected to an ordinary garden hose. This spraying device comprises a housing in which a cartridge of soluble insecticide material or other substance is mounted. Means is provided for causing the water to swirl as it enters the housing so that it swirls around the cartridge and so that a vortex is produced in the outlet end of the housing adjacent the corresponding end of the cartridge. This ensures that the water will contact with the cartridge during its passage through the housing sufficiently to dissolve some of the substance of which the cartridge is composed. Also, it produces a rotation of the cartridge and since one end of the cartridge contacts with the inlet end of the housing, it causes such end to be worn away more readily and to be dissolved more readily. Furthermore, the vortex set up in the housing produces a vacuum which causes the cartridge to be maintained at all times at the inlet end of the housing even when the cartridge is almost completely dissolved. Means is also provided for causing the water to swirl after it leaves the housing and just before it is sprayed from the device so that the insecticide or other substance will be thoroughly dissolved before the solution is sprayed on plants or other objects.

The preferred embodiment of my invention is illustrated in the accompanying drawings wherein similar characters of reference designate corresponding parts and wherein.

Figure 1:
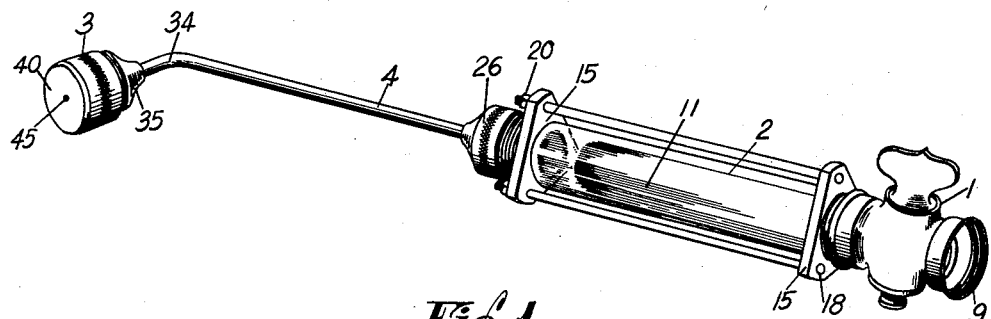
Figure 1 is a perspective view of a spraying device made in accordance with my invention.

With reference to the drawings and particularly to Figure 1, my device is shown as comprising mainly a valve member 1, a cartridge housing 2 and a nozzle member 3 which is in communication with housing 2 by means of a tube 4.

The valve 1 embodies a main portion 5 having a plug 6 rotatably mounted therein. The plug 6 has a transverse opening 7 which may be brought into or out of alignment with a passageway 8 extending through the portion 5. The valve 1 has a threaded fitting 9 on one end by means of which it may be coupled to an ordinary garden hose or the like. The other end of the valve 1 has an internally threaded fitting 10 formed thereon.

The housing 2 preferably embodies a transparent glass tube 11. However, it may be made of other material and need not be transparent. Each end of the glass tube 11 is mounted in a collar member 12. Each collar member 12 comprises a threaded portion 13 and a shouldered portion 14 which receives the end of the tube 11. Each collar 12 has a peripheral flange 15. A gasket 16 is disposed between each end of the tube 11 and the collar 12 in order to prevent breakage of the tube as well as to prevent leakage. The two collars 12 are adapted to be drawn towards each other in such a manner as to tightly hold the tube 11 therebetween by means of a plurality of rods 17. It will be apparent from Figure 1 that the flanges 15 are preferably substantially triangular in outline and, therefore, I preferably provide three rods 17. One end of each rod is threaded into an opening in the flange 15 of one of the collar members, as indicated at 18, while the other end loosely passes through an opening in the flange 15 of the other collar member 12, as indicated at 19. The rod projects through the last-named opening and has a nut 20 threaded thereon. It will be apparent that by adjusting the nuts 20, the tube 11 may be firmly held in position between the two collar members or may be removed therefrom.

Figure 2:
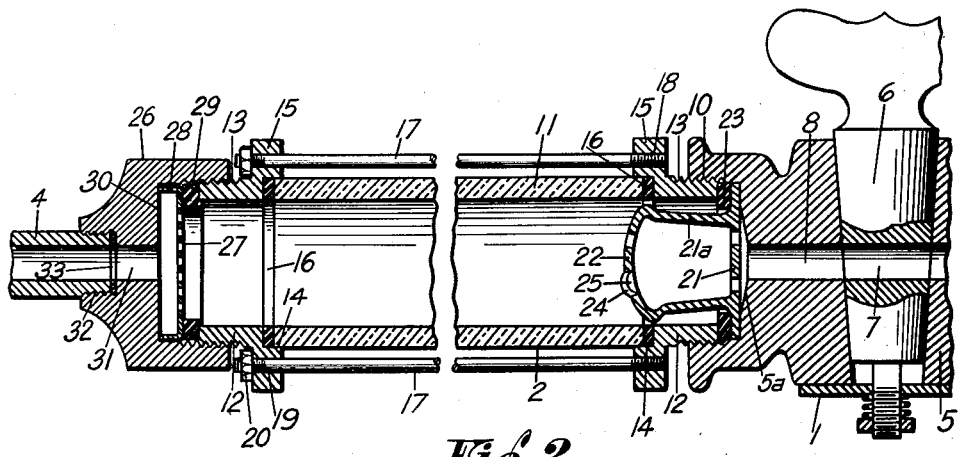
Figure 2 is a longitudinal section taken through the housing and associated parts of my device.
Figure 3:
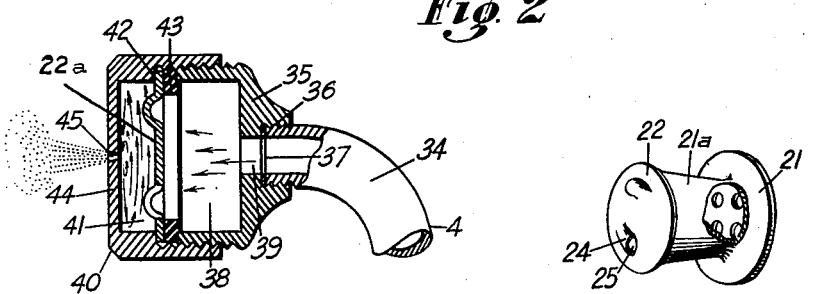
Figure 3 is a section of the nozzle of my spraying device illustrating the mixing chamber thereof.
Figure 4:
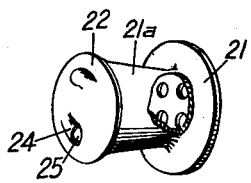
Figure 4 is a detail of a member through which the water passes before it enters the cartridge housing and which is constructed in such a manner that as the water passes therethrough it is caused to swirl.

The threaded portion 13 of one of the collar members 12 is threaded into the fitting 10 of the valve member 1. It will be apparent from Figure 2 that at the inner end of passageway 8 the portion 5 of valve 1 has a concave surface 5a. Adjacent this surface 5a, a disk 21 is disposed which has a plurality of perforations formed therein. This disk 21 is held in position by the inner end of the portion 13 of the collar 12. A gasket 23 is disposed between the inner end of portion 13 and the disk 21 in order to prevent leakage. The disk 21 has a substantially tubular portion 21a formed integrally therewith and projecting inwardly therefrom. The inner end of this member 21a has a convex substantially disk-like portion 22 disposed thereon. This disk 22 is provided with a pair of raised portions 24 which are arcuately curved and each of which has an opening 25 at its end. It will be apparent that water will flow through passageway 8 and beneath disk 21 and through the perforations therein. It will then pass through the tubular portion 21a and then through the curved or spiral passageways formed in the portions 24 of the disk 22 and will emerge through the openings 25 to the opposite side of the disk. Furthermore, because of the tangential arrangement and the shape of portions 24, the water will be caused to swirl in such a manner that it will center the cartridge in the housing so that water will contact with all portions thereof. The disk 22 is preferably disposed at such a point that as the water passes therethrough and is caused to swirl it contacts with the smooth surface of the glass housing which will not retard its flow.

The collar member 12 at the opposite end of the tube 11 is threaded into a coupling 26. Within the coupling 26, I provide a strainer member 27 having a flange 28 formed along its periphery. A gasket 29 is disposed between the strainer member 27 and the inner end of the portion 13 of the collar 12. The flange 28 prevents the body portion of the strainer member from resting against the flat surface 30 of the fitting 26. Consequently, the entire area of the strainer will be effective. A small outlet passageway 31 is provided in the fitting 26. One end of the tube 4 is threaded into the outer end of the fitting 26, as indicated at 32. A gasket 33 is disposed between the end of the tube and the fitting.

The outer end of the tube 4 is bent substantially at right angles, as indicated at 34, and the extreme end is threaded into a fitting 35, as at 36, a gasket 37 being provided to prevent leakage. The fitting 35 has a tubular chamber 38 formed therein and an inlet opening 39 is provided for permitting water to flow from tube 4 into chamber 38. The outer surface of fitting 35 is threaded and a tubular fitting 40 is threaded in position thereon. A cylindrical chamber 41 is provided in member 40 and this member is further provided with a shoulder 42. A disk 22a substantially identical with disk 22, but not of convex form, is held between the shoulder 42 and the outer end of the fitting 35. A gasket 43 is also provided at this point to prevent leakage. As the water passes between the openings in the disk 22a it will be swirled the same way as when it passes through the openings in the disk 22. The outer end of the member 40 is substantially closed by a wall 44. However, this wall is provided with a centrally located small opening 45. This opening flares outwardly, as indicated, and is preferably very small in comparison to the inlet passageway 8 for the spraying device. Consequently, the pressure of the water in the spraying device will be maintained at all times. However it may be of various sizes and the velocity of flow of water through the device will be governed by the size of this opening.

A cartridge 46 of substantially cylindrical form is adapted to be placed in the tube 11. This cartridge will be made of an insecticide substance or other substance which may be readily dissolved by water passing through the housing. It may be placed in the housing either by removing the coupling 26 or by removing the valve unit 1. In either case, the cartridge may be readily inserted in the housing.

Figure 5:
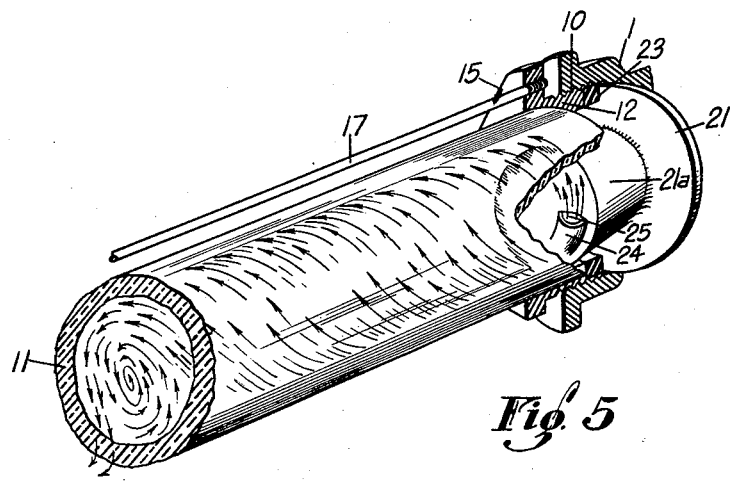
Figure 5 is a detail, partly in perspective and partly in section, illustrating by the arrows how the water travels in the cartridge housing.
Figure 6:
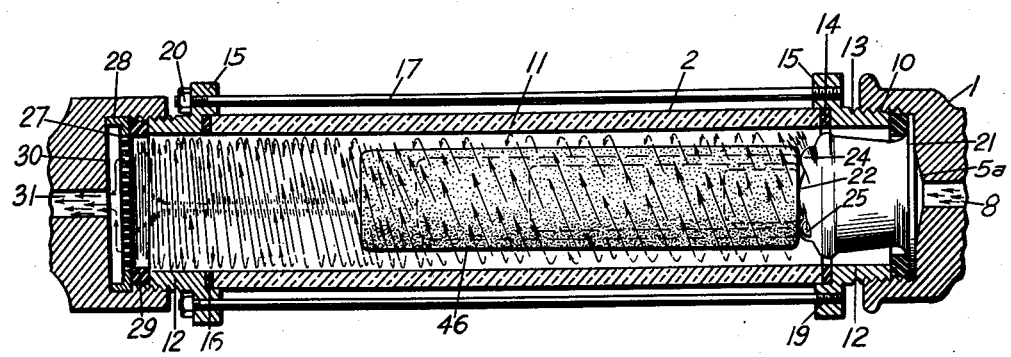
Figure 6 is a longitudinal section of the housing showing the cartridge in position therein and illustrating how the water passes around the cartridge and how the cartridge dissolves away so that its size gradually decreased.
Figure 7:
Figure 7 is a view illustrating how the spraying device may be employed.

In using this device, it is attached to a garden hose or other water conduit, as previously explained. If the valve 1 is open, the water will flow through the passageway 8 and will strike the disk 22. The water will flow into and through tubular portion 22 and will then flow through the passageways formed in both portions 24 of disk 22 and then out through the openings 25 to the opposite side of the disk. As the water passes through these passageways and openings in the disk 22, a swirling action thereof is produced. Consequently, as the water enters the housing 2, it is caused to swirl. The lower end of the cartridge will rest against the disk 22, as indicated best in Figure 6. The water will, therefore, contact with the adjacent end of the cartridge first and will more readily dissolve this end thereof. However, as indicated in Figures 5 and 6, the water will swirl around the cartridge and will gradually pass upwardly around the cartridge towards the opposite end thereof. As indicated in Figure 6, the swirling action of the water produces a vortex in the outlet end of the housing adjacent the corresponding end of the cartridge. The vacuum thus produced tends to draw the cartridge towards the inlet end of the housing so that the corresponding end of the cartridge will always rest against the disk 22. The swirling action of the water also causes the cartridge to rotate and, since its one end contacts with disk 22, it will be more readily worn away and dissolved by the water flowing into the housing. The speed of rotation may be varied by varying the size of the opening 45 in the nozzle. Although the cartridge is eaten away mainly at the end thereof disposed adjacent the inlet end of the housing, the water will dissolve some of it as it passes around the cartridge and travels towards the upper end thereof.

As indicated in Figure 6 by the dotted lines, the cartridge gradually becomes smaller. However, it will always be maintained against the disk 22 and will always be rotated regardless of its size. This causes the dissolving action to take place mainly at the lower end of the cartridge. The longer the cartridge is subjected to the flow of water the softer it becomes and will, therefore, more readily dissolve. Also, the smaller it becomes, the faster it will spin and will be worn and eaten away more readily. Consequently, the solution of insecticide or some other substance produced by water dissolving the cartridge will always have sufficient concentration even after the cartridge becomes very small. In fact, I have found by actual tests that the concentration of the solution will become a little stronger as the cartridge becomes smaller. When the cartridge has been completely dissolved, a new one may be placed in the housing. The glass tube 11 permits one to see when it is necessary to place a new cartridge in the device.

The solution will flow through the strainer member 27 which will prevent large particles of the insecticide or other substance, not dissolved, from leaving the housing. After the water leaves the cartridge housing it will flow through the tube 4 into the nozzle member 3. When it enters the housing member it first passes into the chamber 38. From this chamber 38 it will pass through the curved passageway and the opening in the disk 22a and will enter the chamber 41. Because the disk 22a functions the same as the disk 22, the solution will be swirled in the chamber 41. Consequently, this will insure that the solution is thoroughly mixed and that all particles of the insecticide or other substance will be thoroughly dissolved. From the chamber 41, the solution will flow through the small opening 45. Because this opening is very small and because the walls of the opening flare, the solution will pass from the nozzle in the form of a fine spray or mist.

It will be apparent from the above description that I have provided a device having many desirable features. This spraying device is very simple but works very efficiently. The water will contact with the cartridge in such a manner that it will be rotated and the water swirls in such a manner that one end of the cartridge is maintained in contact with the inlet end of the housing. Consequently, the dissolving action will occur mostly at the corresponding end of the cartridge and regardless of the size of the cartridge the concentration of the solution will remain substantially constant. It will be apparent that since I provide a glass tube housing for the cartridge, the one who uses the spraying device can always see how much of the cartridge is left and when it is necessary to place a new cartridge in the device. When it is necessary to place a new cartridge in the spraying device, the device may be readily disassembled sufficiently to do this.

Having thus described my invention, what I claim is:

1. In combination, a device of the type described comprising a substantially cylindrical cartridge housing, a substantially cylindrical cartridge disposed in said housing and being of a suitable substance adapted to be dissolved by liquid passing through said housing, a disk member located adjacent the inlet end of said housing, said disk member having a plurality of tangentially directed inlet ports formed therein which are located near the center of said cylindrical housing and through which the liquid must pass as it enters said housing so that it will be caused to swirl in said housing.

2. A device of the type described comprising a housing having a substantially cylindrical chamber formed therein through which liquid is adapted to pass, a member located at the inlet end of said chamber, said member having a plurality of tangentially directed inlet ports formed therein which are located near the center of said cylindrical chamber and through which the liquid must pass as it enters said chamber so that it will be caused to swirl in said chamber.

THOMAS W. PICKARD.